United States Patent
Wang

(10) Patent No.: US 7,800,903 B2
(45) Date of Patent: Sep. 21, 2010

(54) HEAT-DISSIPATING STRUCTURE APPLIED TO AT LEAST ONE PORTABLE ELECTRONIC DEVICE

(75) Inventor: Jen-Yu Wang, Chung-Ho (TW)

(73) Assignee: Cooler Master Co., Ltd., Taipei Hsien (TW)

( * ) Notice: Subject to any disclaimer, the term of this patent is extended or adjusted under 35 U.S.C. 154(b) by 19 days.

(21) Appl. No.: 12/285,180

(22) Filed: Sep. 30, 2008

(65) Prior Publication Data

US 2010/0079945 A1    Apr. 1, 2010

(51) Int. Cl.
*H05K 7/20* (2006.01)
*G06F 1/20* (2006.01)

(52) U.S. Cl. ............... 361/695; 361/679.48; 361/679.5; 361/679.55; 361/692; 361/694; 454/184

(58) Field of Classification Search .................. 361/679.48–679.51, 679.55, 690, 692, 694–695; 165/80.3; 174/16.1; 454/184
See application file for complete search history.

(56) References Cited

U.S. PATENT DOCUMENTS

D315,366 S * 3/1991 Greenspahn ................. D19/52

| | | | |
|---|---|---|---|
| 6,707,668 B2 * | 3/2004 | Huang | 361/679.48 |
| 7,417,853 B1 * | 8/2008 | Myers et al. | 361/679.55 |
| 2005/0083650 A1 * | 4/2005 | Yang | 361/687 |
| 2008/0007910 A1 * | 1/2008 | Lin | 361/687 |
| 2008/0084661 A1 * | 4/2008 | Lee | 361/687 |
| 2008/0316692 A1 * | 12/2008 | Jacobs et al. | 361/683 |
| 2009/0004001 A1 * | 1/2009 | Chen | 415/213.1 |
| 2009/0154089 A1 * | 6/2009 | Seo et al. | 361/679.48 |

FOREIGN PATENT DOCUMENTS

WO    WO 2006121229 A1 *  11/2006

* cited by examiner

*Primary Examiner*—Jayprakash N Gandhi
*Assistant Examiner*—Robert J Hoffberg
(74) *Attorney, Agent, or Firm*—Rosenberg, Klein & Lee

(57) ABSTRACT

A heat-dissipating structure includes a support unit and a fan unit disposed in the receiving space. The support unit has a plane portion, a support portion extending downwards from a front side of the plane portion, and an opening passing through the plane portion. The plane portion has a board body, a concave space formed on the top surface of the plane portion, a non-skid pad detachably received in the concave space, a slender block body disposed on a base of the top surface of the board body, and a slender non-skid body disposed on a base of the bottom surface of the board body. The support portion has a support body, a receiving space formed in its inside, a plurality of slender openings formed on two opposite lateral sides of the support body, and a slender non-skid body disposed on a base of the support body.

11 Claims, 12 Drawing Sheets

HEAT-DISSIPATING STRUCTURE APPLIED TO AT LEAST ONE PORTABLE ELECTRONIC DEVICE

BACKGROUND OF THE INVENTION

1. Field of the Invention

The present invention relates to a heat-dissipating structure, and particularly relates to a heat-dissipating structure applied to at least one portable electronic device.

2. Description of the Related Art

As the computer industry develops, more and more people use computers. Using notebook computers, users can conveniently store data and use it for business or teaching purposes when abroad. The design of notebooks tends to be light and thin in order to cause it convenient for the user to carry the notebook. However, when the operation speed of the computer is high, the operation property of the computer is reduced due to the high heat generated by the computer. Furthermore, because the size of the notebook is restricted, an assistant heat-dissipating pad has been invented in order to help dissipate the heat generated by the notebook.

FIG. 1 shows a usage, schematic view of a heat-dissipating pad of the prior art. The heat-dissipating pad P of the prior art can be used to dissipate the heat generated by the notebook B. However, the gap between the notebook B and the heat-dissipating pad P is very small, so that when heat air generated by the notebook B blows downwards, the heat air can not be efficiently discharged to the environment due to the obstruction by the heat-dissipating pad P. Hence, the heat-dissipating efficiency of the heat-dissipating pad P of the prior art applied to the notebook B is decreased due to the small gap between the notebook B and the heat-dissipating pad P.

SUMMARY OF THE INVENTION

One particular aspect of the present invention is to provide a heat-dissipating structure applied to at least one portable electronic device. External cold wind guided by at least one fan passes through a plurality of slender openings and flow to the under space of a board body, and then hot air generated by the portable electronic device passes through an opening and is carried by the cold wind in order to discharge the hot air from two opposite lateral sides of the board body to the environment.

Moreover, the hot air is smoothly discharged from two opposite lateral sides of the board body to the environment by the diverting function of two arc-shaped guide faces of a wind-guiding element.

Furthermore, at least two non-skid bodies are separated from each other and disposed on a base of the bottom surface of the board body for preventing the board body from sliding and supporting the board body up at a predetermined height, so that the hot air is directly discharged from the base of the bottom surface of the board body to the environment.

In addition, the hot air is smoothly discharged from a plurality of thin openings to the environment by the attraction function of two assistant fans.

Another particular aspect of the present invention is to provide a heat-dissipating structure applied to at least one portable electronic device. Because a non-skid pad is detachably received in a concave space, the non-skid pad is replaceable according to user's like or requirement.

Another particular aspect of the present invention is to provide a heat-dissipating structure applied to at least one portable electronic device. A slender block body is disposed on the base of the top surface of the board body, so that when the portable electronic device is placed on the board body, the slender block body can prevent the portable electronic device from sliding downwards.

Another particular aspect of the present invention is to provide a heat-dissipating structure applied to at least one portable electronic device. A slender non-skid body is disposed on the base of the bottom surface of the board body, so that when the user is using the portable electronic device, the slender non-skid body can prevent the board body from sliding.

Another particular aspect of the present invention is to provide a heat-dissipating structure applied to at least one portable electronic device. A slender non-skid body is disposed on the base of the support body, so that when the user is using the portable electronic device, the slender non-skid body can prevent the support body from sliding.

Another particular aspect of the present invention is to provide a heat-dissipating structure applied to at least one portable electronic device. The present invention can increase the stability of using the portable electronic device by selectively matching the non-skid pad, the slender block body, the slender non-skid body and the slender non-skid body.

In order to achieve the above-mentioned aspects, the present invention provides a heat-dissipating structure applied to at least one portable electronic device, including: a support unit and a fan unit. The support unit has a plane portion, a support portion extending downwards from a front side of the plane portion, and an opening passing through the plane portion. The support portion has a receiving space formed in its inside and communicating with the environment. The fan unit has at least one fan disposed in the receiving space.

In order to achieve the above-mentioned aspects, the present invention provides a heat-dissipating structure applied to at least one portable electronic device, including: a support unit and a fan unit. The support unit has a plane portion, a support portion extending downwards from a front side of the plane portion, and an opening passing through the plane portion. The fan unit has a plurality of fans disposed inside the support unit.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which.

DETAILED DESCRIPTION OF THE PREFERRED EMBODIMENTS

Figure 1:
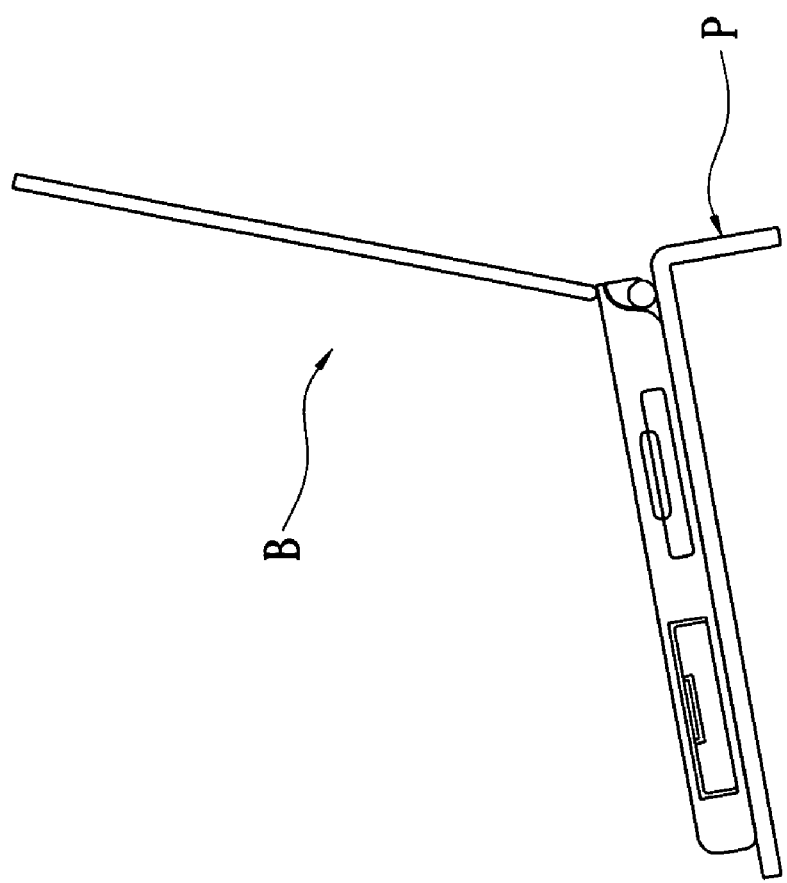
FIG. 1 is a usage, schematic view of a heat-dissipating pad of the prior art.
Figure 2A:
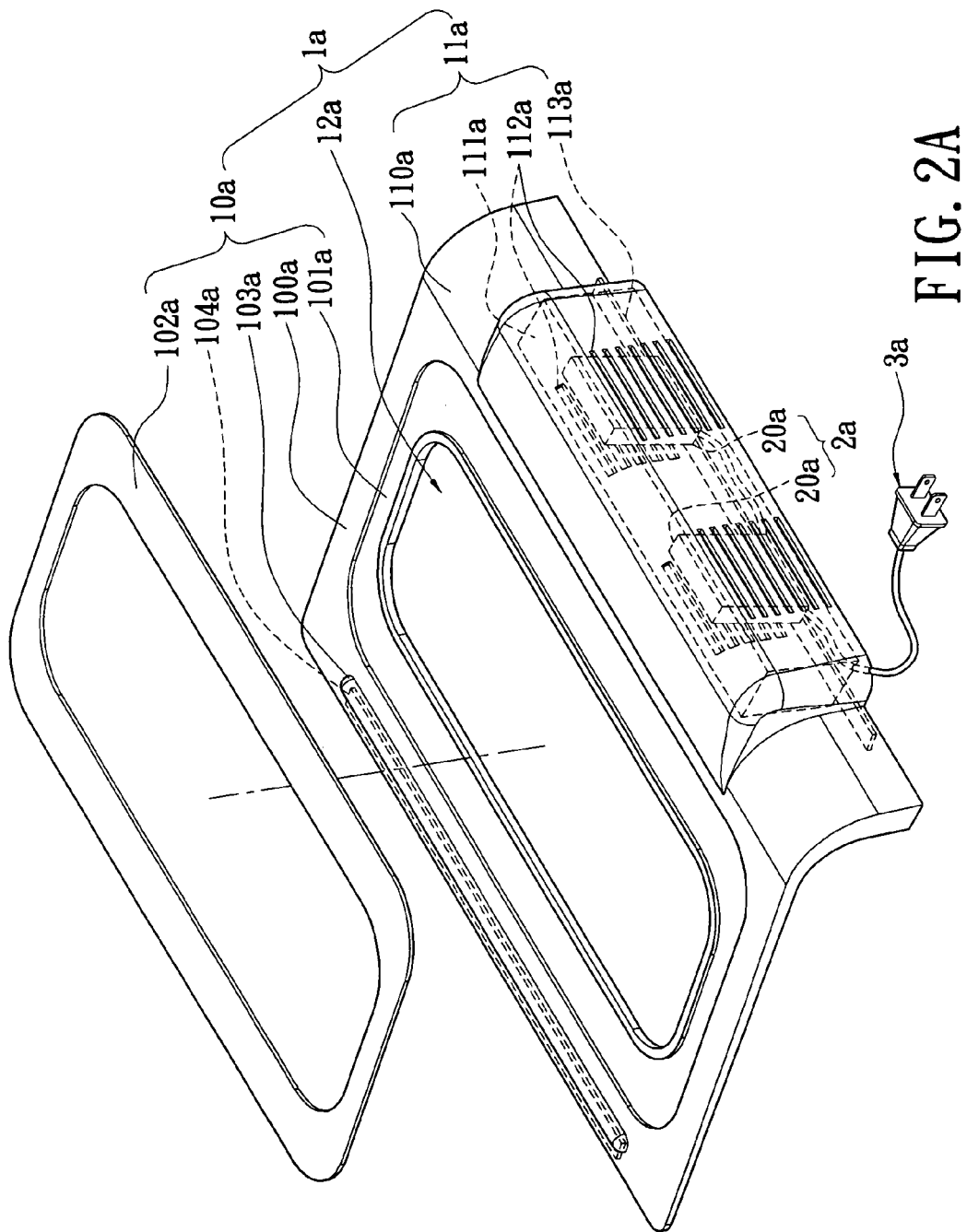
FIG. 2A is a perspective, schematic view of a heat-dissipating structure applied to at least one portable electronic device according to the first embodiment of the present invention.
Figure 2B:
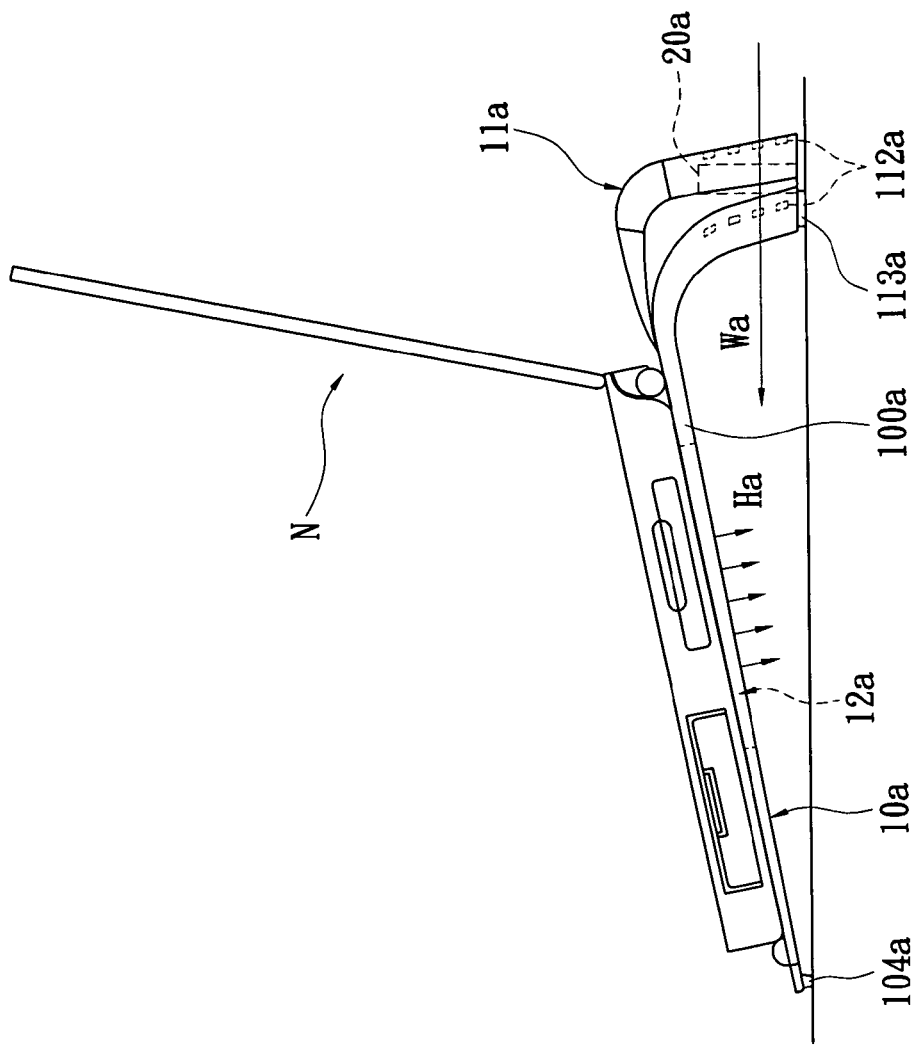
FIG. 2B is a lateral, schematic view of a heat-dissipating structure applied to at least one portable electronic device according to the first embodiment of the present invention.
Figure 2C:
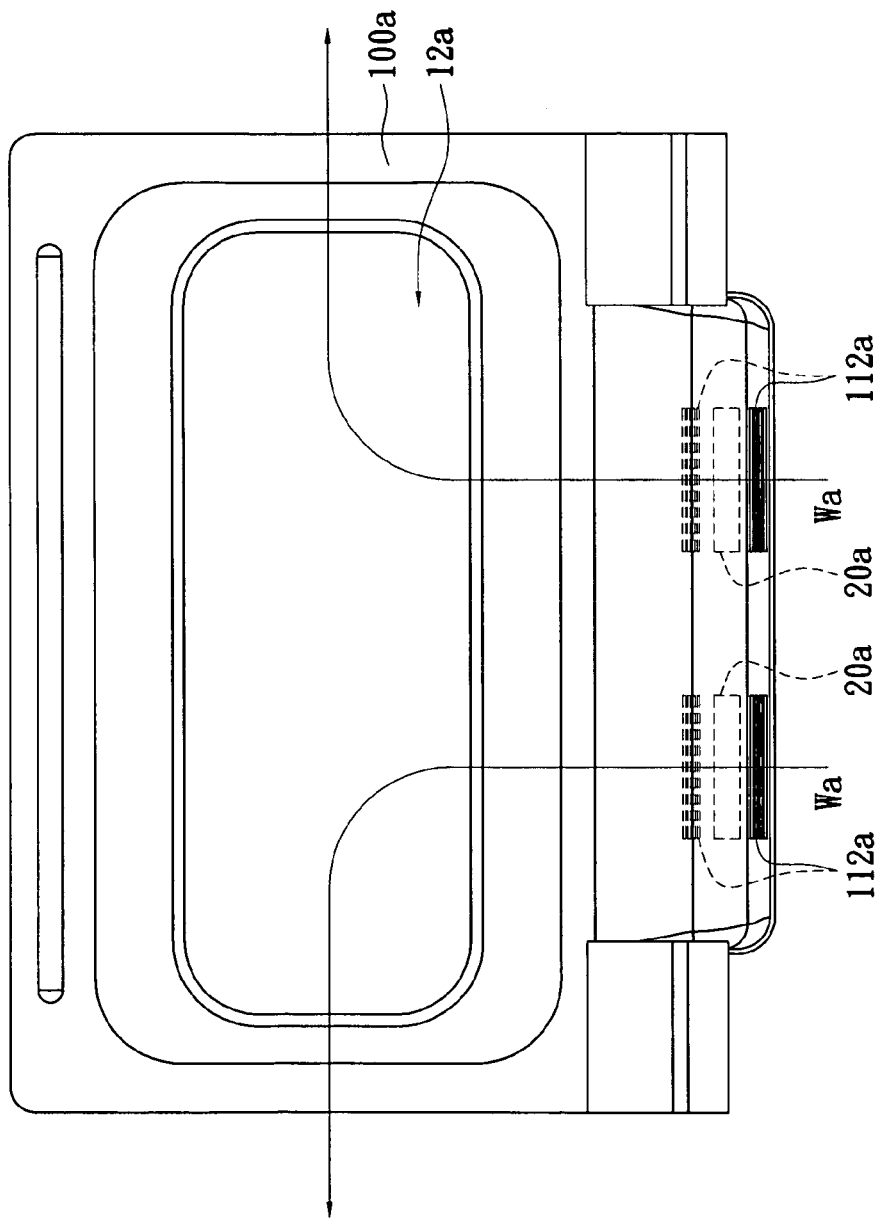
FIG. 2C is a top, schematic view of a heat-dissipating structure applied to at least one portable electronic device according to the first embodiment of the present invention.

Referring to FIGS. 2A to 2C, the first embodiment of the present invention provides a heat-dissipating structure applied to at least one portable electronic device N, including: a support unit $1a$ and a fan unit $2a$.

The support unit $1a$ has a plane portion $10a$, a support portion $11a$ extending downwards from a front side of the plane portion $10a$, and an opening $12a$ passing through the plane portion $10a$.

The plane portion $10a$ has a board body $100a$, a concave space $101a$ formed on the top surface of the plane portion $100a$, a non-skid pad $102a$ detachably received in the concave space $101a$, a slender block body $103a$ disposed on a base of the top surface of the board body $100a$, and a slender non-skid body $104a$ disposed on a base of the bottom surface of the board body $100a$.

Moreover, because the non-skid pad $102a$ is detachably received in the concave space $101a$, the non-skid pad $102a$ is replaceable according to user's like or requirement. In addition, the slender block body $103a$ is disposed on the base of the top surface of the board body $100a$, so that when the portable electronic device N is placed on the board body $100a$, the slender block body $103a$ can prevent the portable electronic device N from sliding downwards. Furthermore, the slender non-skid body $104a$ is disposed on the base of the bottom surface of the board body $100a$, so that when the user is using the portable electronic device N, the slender non-skid body $104a$ can prevent the board body $100a$ from sliding.

The support portion $11a$ has a support body $110a$, a receiving space $111a$ formed in its inside, a plurality of slender openings (slots) $112a$ formed on two opposite lateral sides of the support body $110a$ and communicating with the receiving space $111a$, and a slender non-skid body $113a$ disposed on a base of the support body $110a$. Moreover, the slender non-skid body $113a$ is disposed on the base of the support body $110a$, so that when the user is using the portable electronic device N, the slender non-skid body $113a$ can prevent the support body $110a$ from sliding.

Hence, the present invention can increase the stability of using the portable electronic device N by matching the non-skid pad $102a$, the slender block body $103a$, the slender non-skid body $104a$ and the slender non-skid body $113a$. However, the non-skid pad $102a$, the slender block body $103a$, the slender non-skid body $104a$ and the slender non-skid body $113a$ are example of non-skid structures only. The user can choose one or more non-skid structures in order to increase the stability of using the portable electronic device N.

Furthermore, in the first embodiment, the fan unit $2a$ has two fans $20a$ disposed in the receiving space $111a$. Of course, the number of fans can be one or more than one according to different design requirement. In addition, the type of fan can be replaced according to the designer's requirement.

Moreover, the heat-dissipating structure further includes an electrical connection unit $3a$ electrically connected with the two fans $20a$. The electrical connection unit $3a$ can be a plug or a USB (Universal Serial Bus) connector. In the first embodiment, the electrical connection unit $3a$ is a plug. However, the examples of the plug and the USB connector do not use to limit the present invention, any types of electrical connection can be applied to the present invention.

Hence, referring to FIGS. 2B and 2C (after removing the portable electronic device N), external cold wind Wa moved by the two fans $20a$ passes through the slender openings $112a$ and to flow to the space underneath the board body $100a$, and then hot air Ha generated by the portable electronic device N passes through the opening $12a$ and is carried by the cold wind Wa in order to discharge the hot air Ha from two opposite lateral sides of the board body $100a$ to the environment.

Figure 3A:
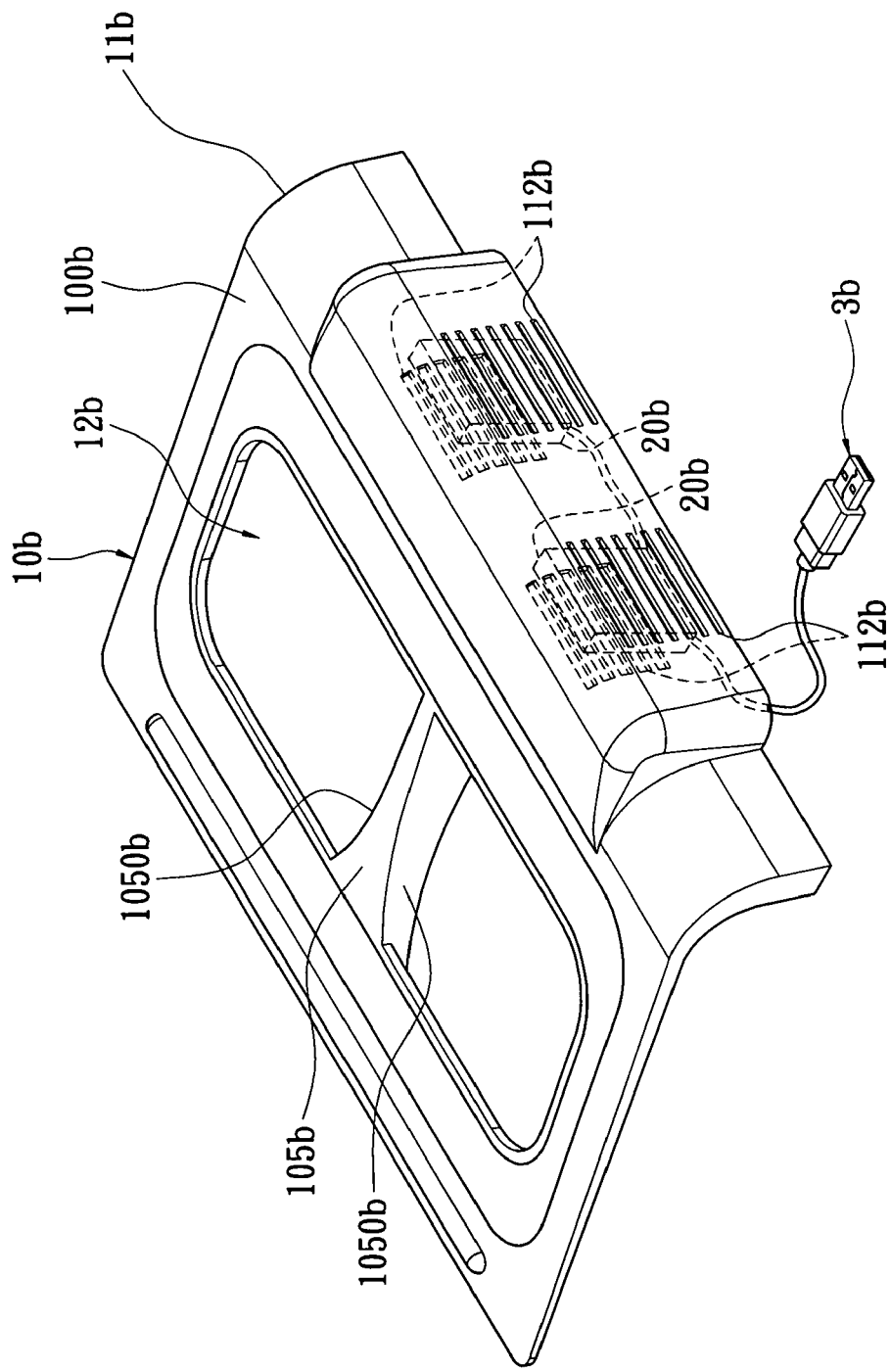
FIG. 3A is a perspective, schematic view of a heat-dissipating structure applied to at least one portable electronic device according to the second embodiment of the present invention.
Figure 3B:
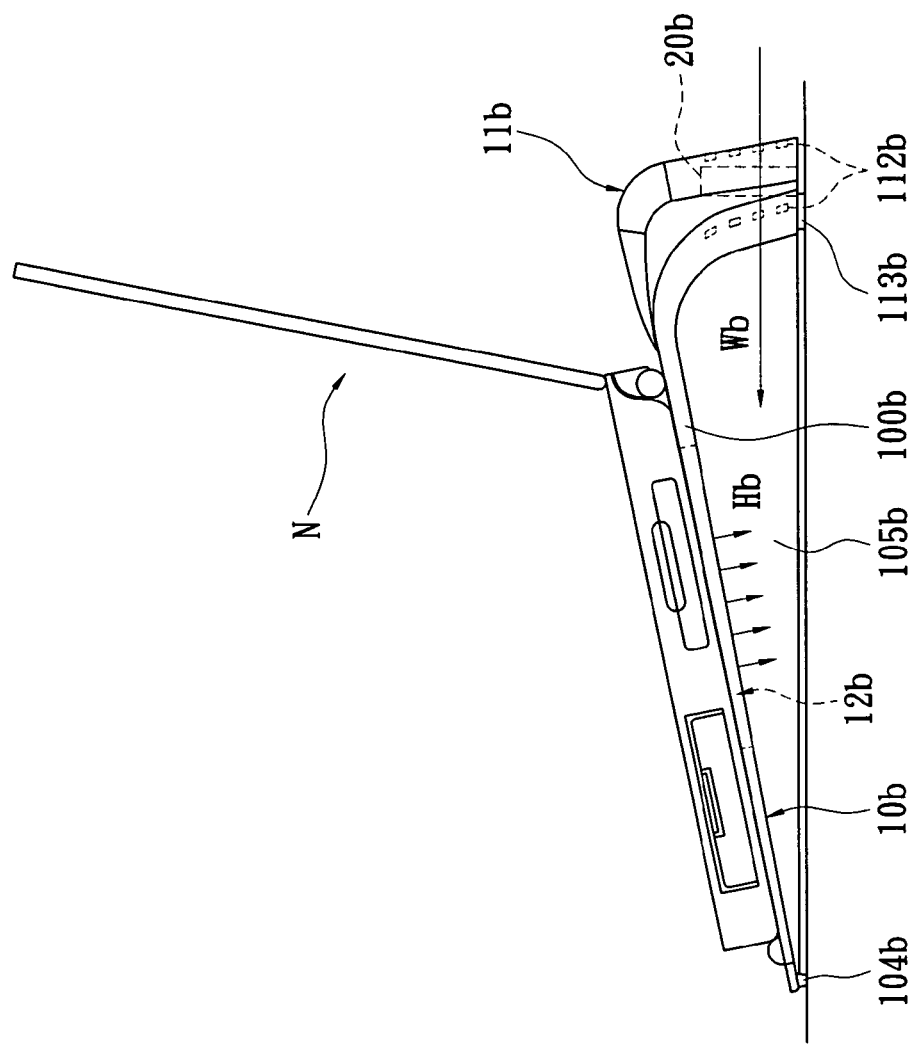
FIG. 3B is a lateral, schematic view of a heat-dissipating structure applied to at least one portable electronic device according to the second embodiment of the present invention.
Figure 3C:
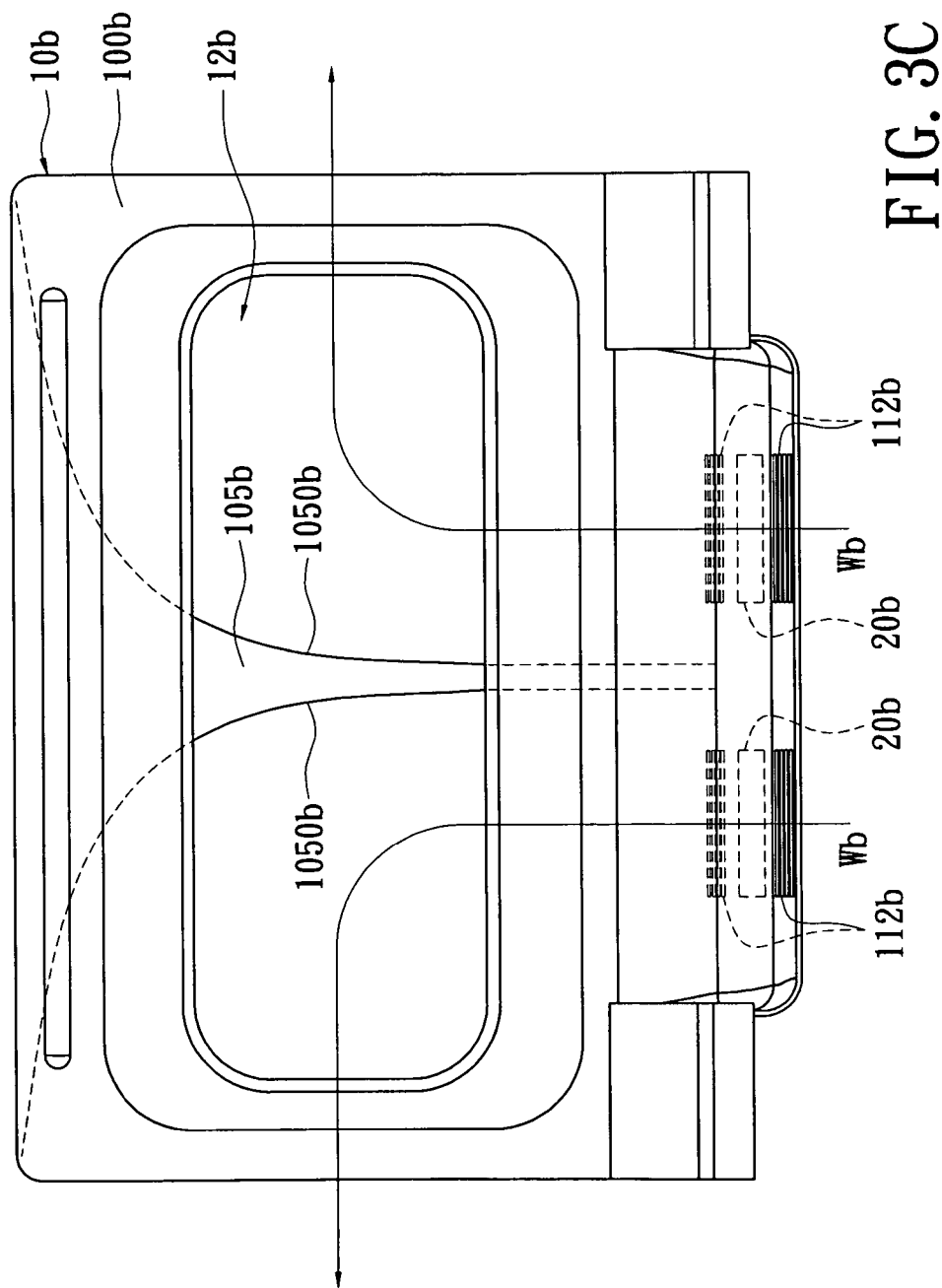
FIG. 3C is a top, schematic view of a heat-dissipating structure applied to at least one portable electronic device according to the second embodiment of the present invention.

Referring to FIGS. 3A and 3C, the difference between the second embodiment and the first embodiment is that: in the second embodiment, a plane portion $10b$ (a support portion $11b$ is extended downwards from a front side of the plane portion $10b$) has a board body $100b$ and a wind-guiding element $105b$ disposed on the bottom surface of the board body $100b$ in order to cause external cold wind Wb moved by two fans $20b$ to flow to the space underneath the board body $100b$ and to discharge from two opposite lateral sides of the board body $100b$. In addition, the wind-guiding element $105b$ has two arc-shaped guide faces $1050b$ respectively facing the two fans $20b$. In the second embodiment, an electrical connection unit $3b$ is a USB connector.

Hence, referring to FIGS. 3B and 3C (after removing the portable electronic device N), external cold wind Wb moved by the two fans $20b$ passes through the slender openings $112b$ and to flow to the space underneath the board body $100b$, and then hot air Hb generated by the portable electronic device N passes through the opening $12b$ and is carried by the cold wind Wb in order to smoothly discharge the hot air Hb from two opposite lateral sides of the board body $100b$ to the environment by the diverting function of the two arc-shaped guide faces $1050b$. In other words, the mixture of the hot air Hb and the cold wind Wb does not generate vortex phenomenon at dead space under the board body $100b$, so that the usage of the two arc-shaped guide faces $1050b$ can prevent the hot air from being held up under the board body $100b$. Hence, the hot air generate by the portable electronic device N can be quickly and efficiently discharged to the environment according to the flow path of the cold wind.

Figure 4A:
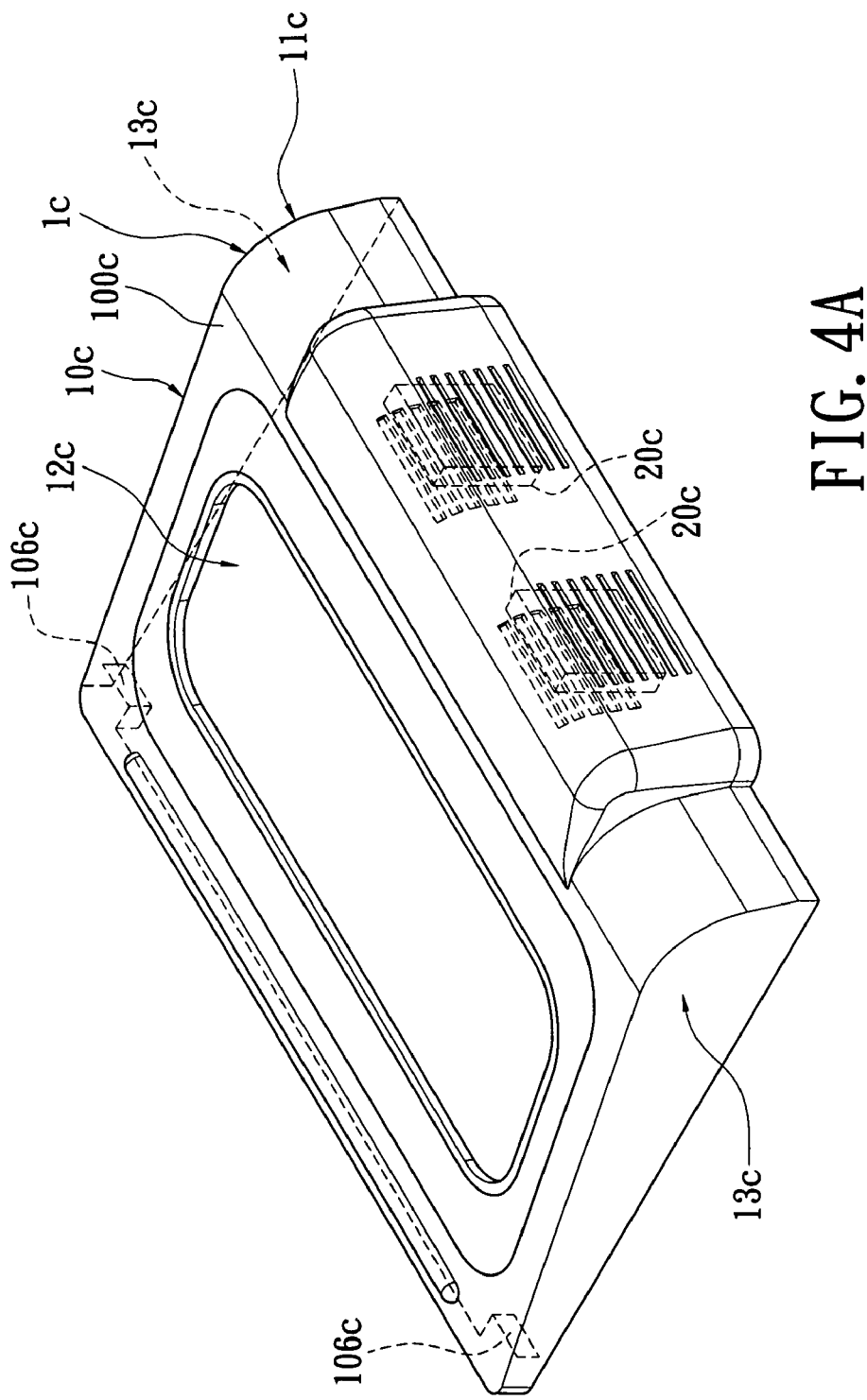
FIG. 4A is a perspective, schematic view of a heat-dissipating structure applied to at least one portable electronic device according to the third embodiment of the present invention.
Figure 4B:
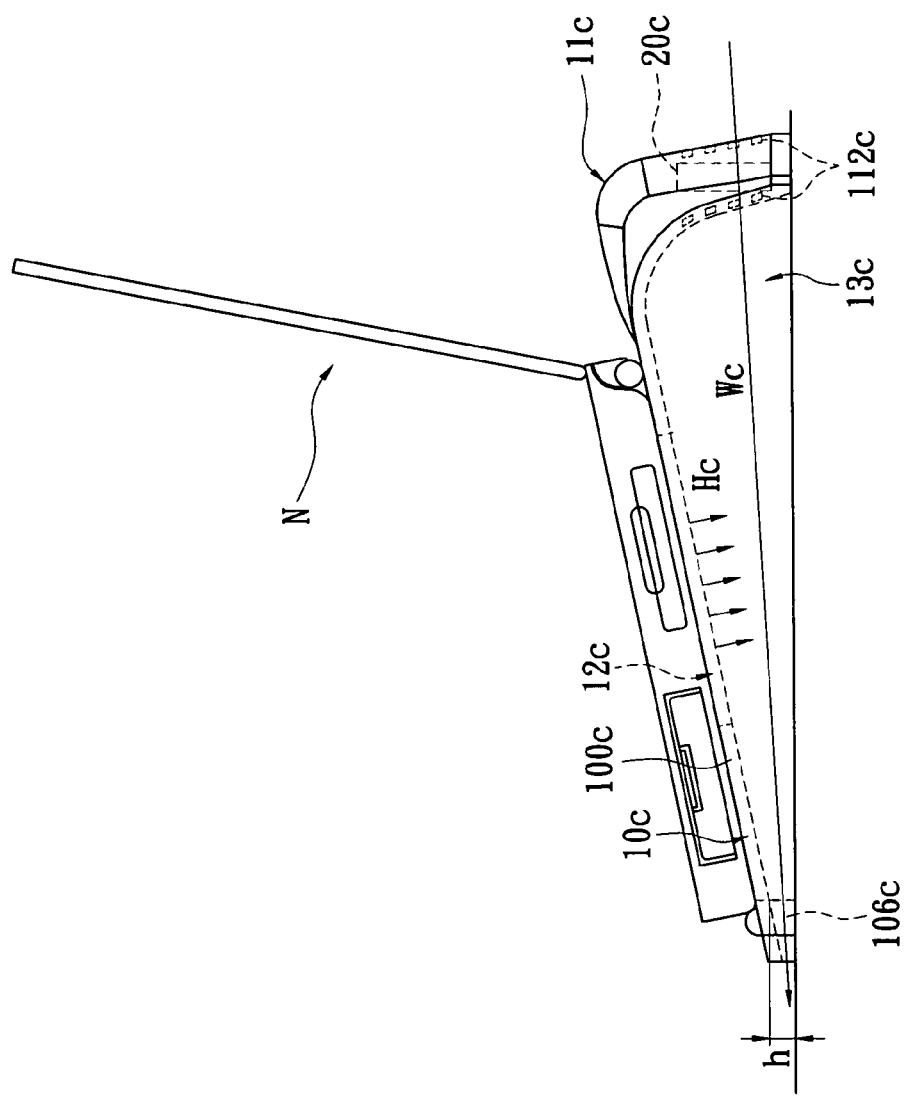
FIG. 4B is a lateral, schematic view of a heat-dissipating structure applied to at least one portable electronic device according to the third embodiment of the present invention.
Figure 4C:
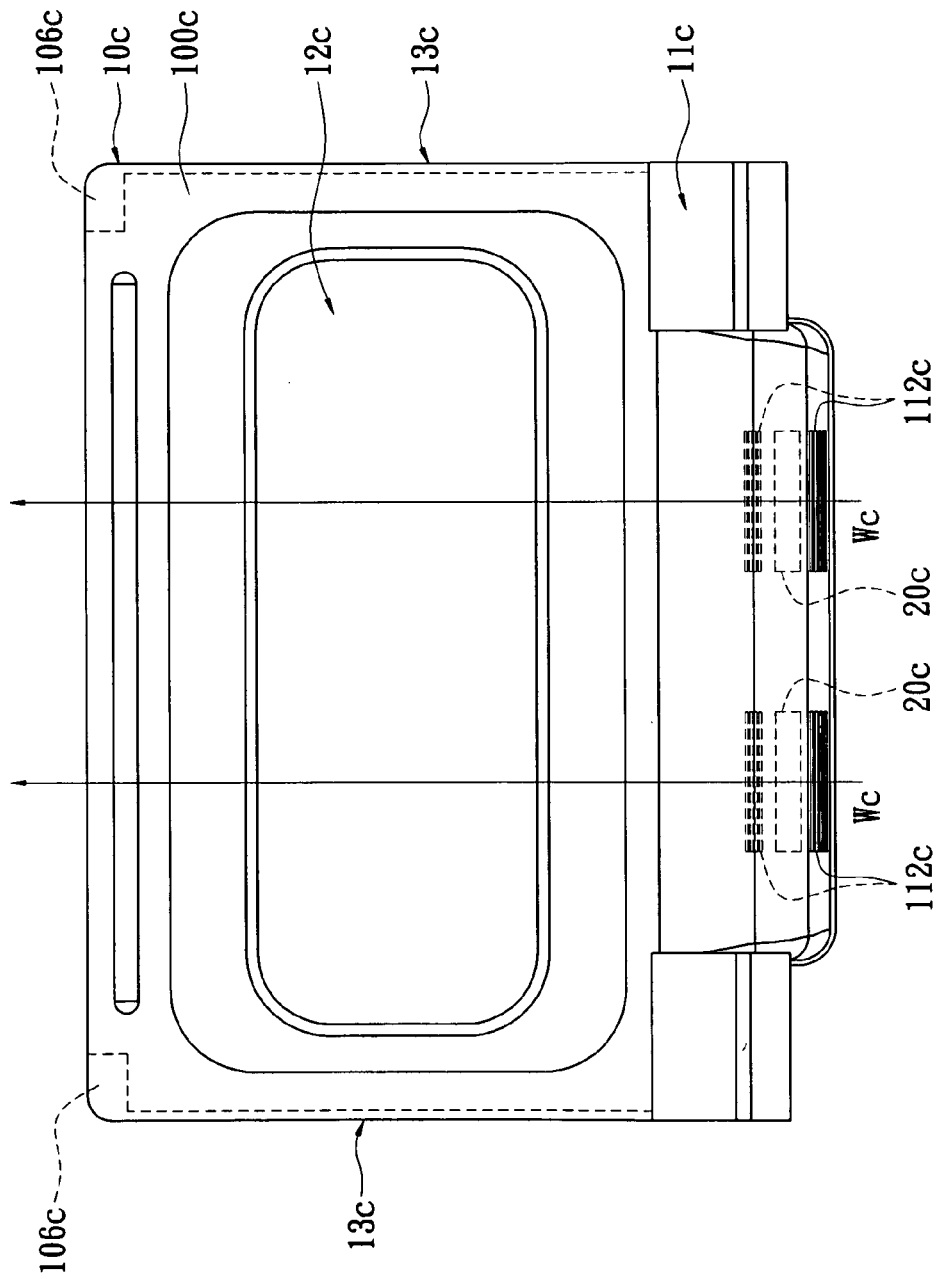
FIG. 4C is a top, schematic view of a heat-dissipating structure applied to at least one portable electronic device according to the third embodiment of the present invention.

Referring to FIGS. 4A and 4C, the difference between the third embodiment and the first embodiment is that: in the third embodiment, a support unit $1c$ further includes two lateral board portions $13c$ respectively extending downwards from two opposite sides of a plane portion 10c and respectively connected with two opposite sides of the support portion 11c, and the plane portion 10c further includes at least two non-skid bodies 106c separated from each other and disposed on a base of the bottom surface of the board body 100c for preventing the board body 100c from sliding and supporting the board body 100c up at a predetermined height, in order to cause external cold wind Wc moved by two fans 20c to flow to the space underneath the board body 100c and to discharge from a base of the bottom surface of the board body 100c.

Hence, referring to FIGS. 4B and 4C (after removing the portable electronic device N), external cold wind Wc moved by the two fans 20c passes through the slender openings 112c and to flow to the space underneath the board body 100c, and then hot air Hc generated by the portable electronic device N passes through the opening 12c and is carried by the cold wind Wc in order to directly discharge the hot air Hc from the base of the bottom surface of the board body 100c to the environment. Hence, the hot air generate by the portable electronic device N can be quickly and efficiently discharged to the environment according to the approximate straight line flow path of the cold wind.

Figure 5A:
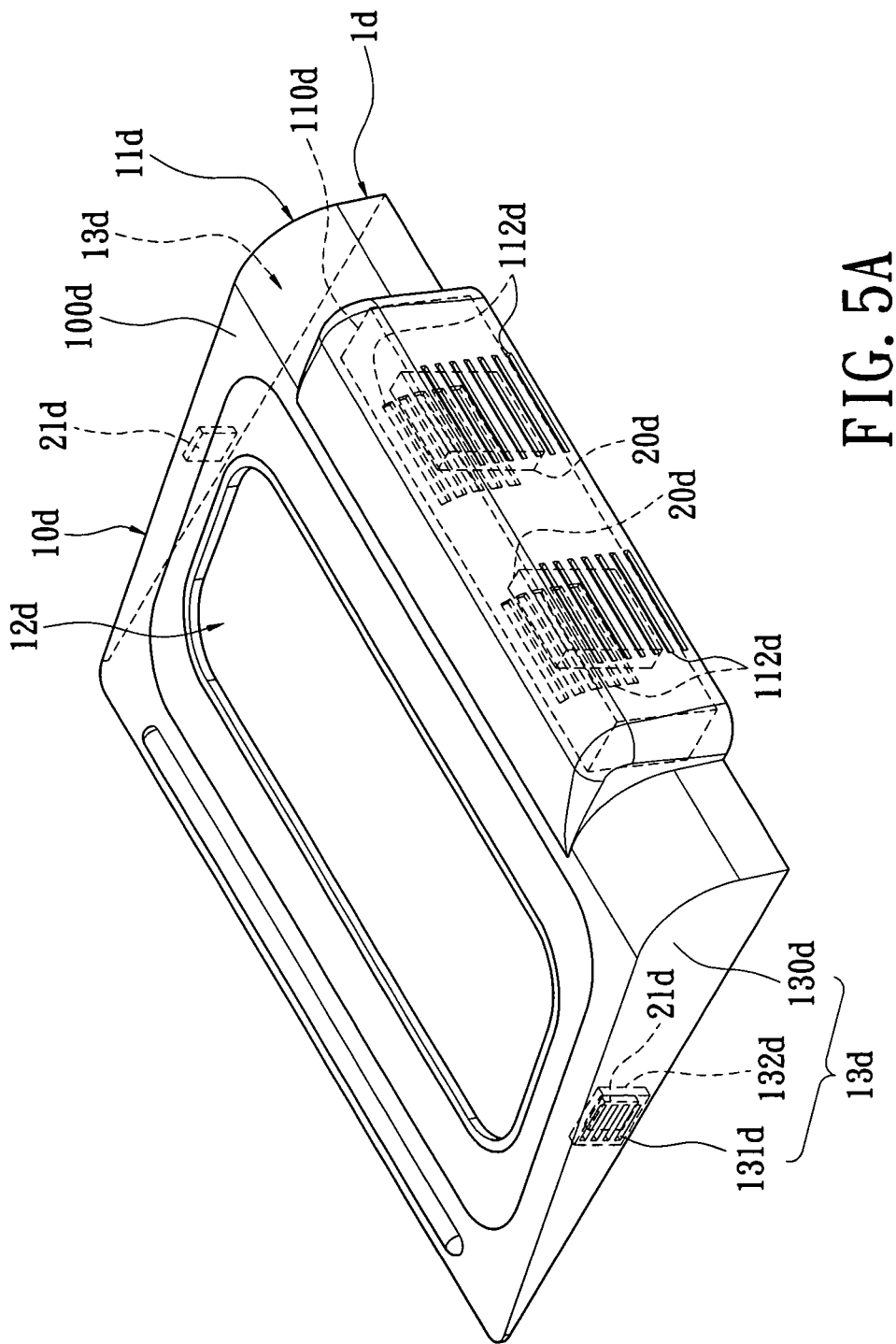
FIG. 5A is a perspective, schematic view of a heat-dissipating structure applied to at least one portable electronic device according to the fourth embodiment of the present invention.

Referring to FIGS. 5A and 5C, the difference between the fourth embodiment and the first embodiment is that: in the fourth embodiment, a support unit 1d further includes two lateral board portions 13d respectively extending downwards from two opposite sides of the plane portion 10d and respectively connected with two opposite sides of a support portion 11d. Each lateral board portion 13d has a lateral board body 130d, a plurality of thin openings 131d formed on two opposite sides of the lateral board body 130d, and an accommodating space 132d communicating with the slender openings 131d. Two first fans 20d are received in the receiving space 110d of the support portion 11d, and two second fans 21d are respectively received in the two accommodating spaces 132d of the two lateral board portions 13d, in order to cause external cold wind Wd moved by the two first fans 20d to pass through the slender openings 112d and to discharge from the thin openings 131d to the environment.

Figure 5B:
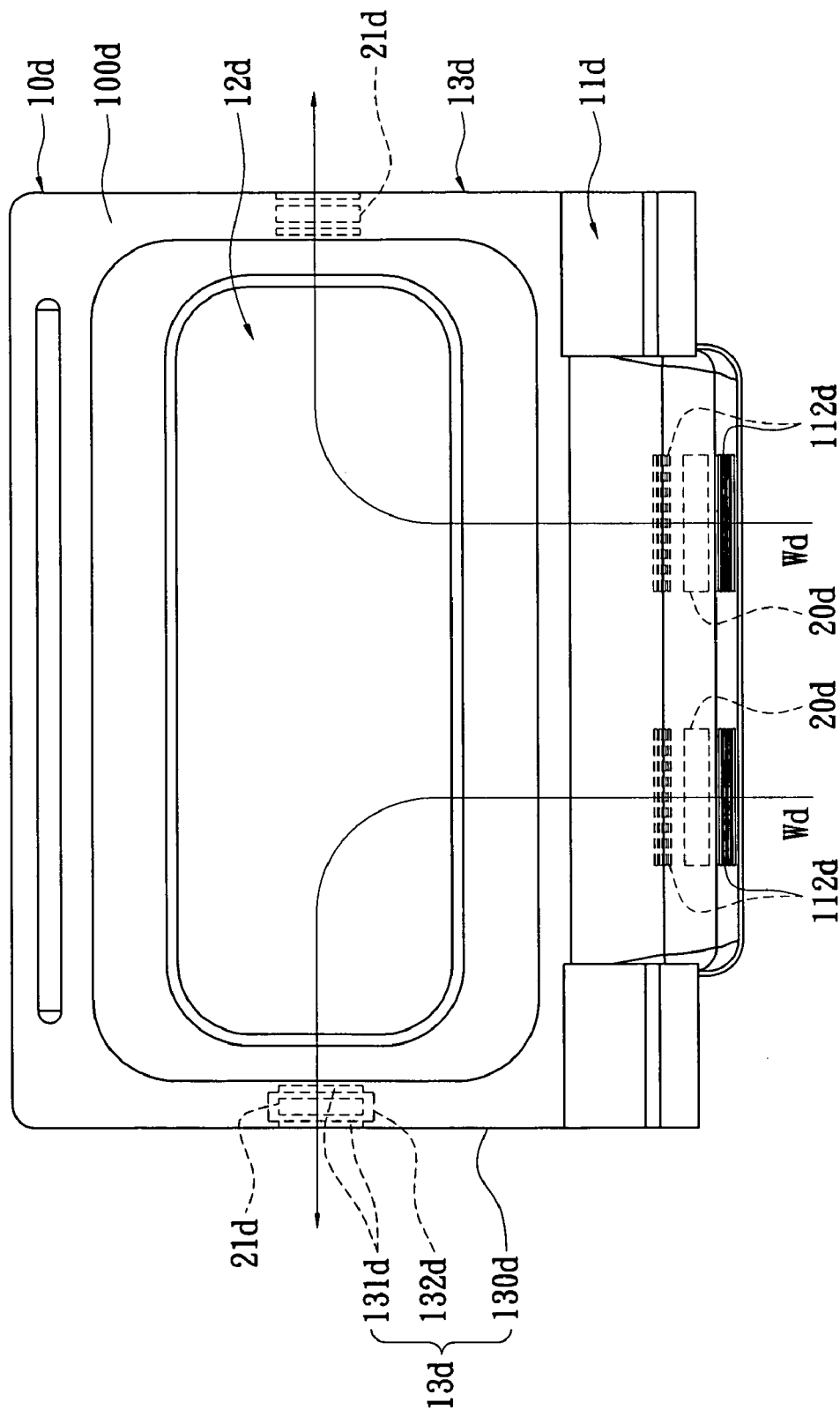
FIG. 5B is a top, schematic view of a heat-dissipating structure applied to at least one portable electronic device according to the fourth embodiment of the present invention.

Hence, referring to FIG. 5B, external cold wind Wd moved by the two fans 20d passes through the slender openings 112d and to flow to the space underneath the board body 100d, and then hot air (not shown) generated by the portable electronic device N passes through the opening 12d and is carried by the cold wind Wd in order to smoothly discharge the hot air from the thin openings 131d to the environment by the attraction function of the two fans 21d. In other words, the mixture of the hot air and the cold wind Wd does not generate vortex phenomenon at dead space under the board body 100d, so that the usage of the two fans 21d can prevent the hot air from being held up under the board body 100d. Hence, the hot air generate by the portable electronic device N can be quickly and efficiently discharged to the environment according to the flow path of the cold wind.

In conclusion, the heat-dissipating structure applied to at least one portable electronic device of the present invention includes following advantages:

(1) Referring to FIG. 2A, because the non-skid pad 102a is detachably received in the concave space 101a, the non-skid pad 102a is replaceable according to user's like or requirement.

(2) Referring to FIGS. 2A and 2B, the slender block body 103a is disposed on the base of the top surface of the board body 100a, so that when the portable electronic device N is placed on the board body 100a, the slender block body 103a can prevent the portable electronic device N from sliding downwards.

(3) Referring to FIGS. 2A and 2B, the slender non-skid body 104a is disposed on the base of the bottom surface of the board body 100a, so that when the user is using the portable electronic device N, the slender non-skid body 104a can prevent the board body 100a from sliding.

(4) Referring to FIGS. 2A and 2B, the slender non-skid body 113a is disposed on the base of the support body 110a, so that when the user is using the portable electronic device N, the slender non-skid body 113a can prevent the support body 110a from sliding.

(5) Referring to FIGS. 2A and 2B, the present invention can increase the stability of using the portable electronic device N by selectively matching the non-skid pad 102a, the slender block body 103a, the slender non-skid body 104a and the slender non-skid body 113a.

(6) Referring to FIGS. 2B and 2C, external cold wind Wa moved by the two fans 20a passes through the slender openings 112a and to flow to the space underneath the board body 100a, and then hot air Ha generated by the portable electronic device N passes through the opening 12a and is carried by the cold wind Wa in order to discharge the hot air Ha from two opposite lateral sides of the board body 100a to the environment.

(7) Referring to FIGS. 3B and 3C, external cold wind Wb moved by the two fans 20b passes through the slender openings 112b and to flow to the space underneath the board body 100b, and then hot air Hb generated by the portable electronic device N passes through the opening 12b and is carried by the cold wind Wb in order to smoothly discharge the hot air Hb from two opposite lateral sides of the board body 100b to the environment by the diverting function of the two arc-shaped guide faces 1050b.

(8) Referring to FIGS. 4B and 4C, external cold wind Wc moved by the two fans 20c passes through the slender openings 112c and to flow to the space underneath the board body 100c, and then hot air Hc generated by the portable electronic device N passes through the opening 12c and is carried by the cold wind Wc in order to directly discharge the hot air Hc from the base of the bottom surface of the board body 100c to the environment.

(9) Referring to FIG. 5B, external cold wind Wd moved by the two fans 20d passes through the slender openings 112d and to flow to the space underneath the board body 100d, and then hot air (not shown) generated by the portable electronic device N passes through the opening 12d and is carried by the cold wind Wd in order to smoothly discharge the hot air from the thin openings 131d to the environment by the attraction function of the two fans 21d.

Although the present invention has been described with reference to the preferred best molds thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A heat-dissipating structure applied to at least one portable electronic device, comprising:

a support unit having a plane portion, a support portion extending downwards from a front side of the plane portion, and an opening passing through the plane portion, wherein the support portion has a receiving space formed therein and communicating with an external environment, and the support unit has a hollow space formed under the plane portion and communicated with the opening and has two opposite outlets formed under two opposite lateral sides of the plane portion and communicated with the hollow space; and a fan unit having at least one fan disposed in the receiving space;

wherein the at least one portable electronic device is disposed on the plane portion and hot air generated by the at least one portable electronic device is transmitted to the hollow space through the opening;

wherein external cold wind is transmitted from the environment to the hollow space by the at least one fan for guiding the hot air that has been transmitted to the hollow space and discharged to the environment through the two opposite outlets.

2. The heat-dissipating structure as claimed in claim 1, wherein the plane portion has a board body that has been penetrated by the opening, a concave space formed on the top surface of the plane portion, and a non-skid pad detachably received in the concave space.

3. The heat-dissipating structure as claimed in claim 2, wherein the plane portion has a block body disposed on a base of the top surface of the board body in order to prevent the at least one portable electronic device from sliding downwards.

4. The heat-dissipating structure as claimed in claim 2, wherein the plane portion has a non-skid body disposed on a base of the bottom surface of the board body in order to prevent the board body from sliding.

5. The heat-dissipating structure as claimed in claim 1, wherein the support portion has a support body and a plurality of slots formed on two opposing sides of the support body, and the slots communicate with the receiving space in order to cause the external cold wind moved by the at least one fan to pass into and out of the receiving space through the slots.

6. The heat-dissipating structure as claimed in claim 5, wherein the support portion has a non-skid body disposed on a base of the support body in order to prevent the support body from sliding.

7. The heat-dissipating structure as claimed in claim 1, further comprising an electrical connection unit electrically connected with the at least one fan and the electrical connection unit is a plug or a USB connector.

8. A heat-dissipating structure applied to at least one portable electronic device, comprising:

a support unit having a plane portion, a support portion extending downwards from a front side of the plane portion, an opening passing through the plane portion, and two lateral board portions respectively extending downwards from two opposite lateral sides of the plane portion and respectively connected with two ends of the support portion, wherein the support portion has a receiving space formed therein and communicating with an external environment, and the support unit has a hollow space formed under the plane portion and communicated with the opening; and a fan unit having at least one fan disposed in the receiving space;

wherein the plane portion has a board body and at least two non-skid bodies separated from each other and disposed under one end of the board body for preventing the board body from sliding and supporting the end of the board body up at a predetermined height to form a gap under the end of the board body and between the at least two non-skid bodies;

wherein the at least one portable electronic device is disposed on the plane portion and hot air generated by the at least one portable electronic device is transmitted to the hollow space through the opening;

wherein external cold wind is transmitted from the environment to the hollow space by the at least one fan for guiding the hot air that has been transmitted to the hollow space and discharged to the environment through the gap only.

9. The heat-dissipating structure as claimed in claim 8, wherein the support portion has a support body and a plurality of slots formed on two opposing sides of the support body, and the slots communicate with the receiving space in order to cause the external cold wind moved by the at least one fan to pass into and out of the receiving space through the slots.

10. A heat-dissipating structure applied to at least one portable electronic device, comprising:

a support unit having a plane portion, a support portion extending downwards from a front side of the plane portion, an opening passing through the plane portion, and two lateral board portions respectively extending downwards from two opposite lateral sides of the plane portion and respectively connected with two ends of the support portion, wherein the support portion has a receiving space formed therein and communicating with an external environment, and each lateral board portion has an accommodating space formed therein and communicating with the environment; and a fan unit having at least one first fans received in the receiving space and at least one second fans received in the accommodating space.

11. The heat-dissipating structure as claimed in claim 10, wherein the support portion has a support body and a plurality of slots formed on two opposing sides of the support body, the slots communicate with the receiving space, each lateral board portion has a lateral board body and a plurality of slot openings formed on two opposite sides of the lateral board body, the slot openings communicate with the accommodating space, in order to cause external cold wind moved by the at least one first fan to pass through the slots and to discharge from the slot openings to the environment.

* * * * *